United States Patent [19]

Danel et al.

[11] Patent Number: 4,653,326

[45] Date of Patent: Mar. 31, 1987

[54] DIRECTIONAL ACCELEROMETER AND ITS MICROLITHOGRAPHIC FABRICATION PROCESS

[75] Inventors: Jean-Sebastien Danel, Grenoble; Gilles Delapierre, Seyssinet; France Michel, Sassenage, all of France

[73] Assignee: Commissariat a l'Energie Atomique, Paris, France

[21] Appl. No.: 686,902

[22] Filed: Dec. 27, 1984

[30] Foreign Application Priority Data

Jan. 12, 1984 [FR] France ................................ 84 00414

[51] Int. Cl.⁴ ......................................... G01P 15/125
[52] U.S. Cl. ................................. 73/517 R; 73/517 B
[58] Field of Search .......... 73/517 AV, 517 R, 517 B, 73/510

[56] References Cited

U.S. PATENT DOCUMENTS

| | | | |
|---|---|---|---|
| 3,877,313 | 4/1975 | Ferriss | 73/516 R |
| 4,050,049 | 9/1977 | Youmans | 73/517 R X |
| 4,094,199 | 6/1978 | Holdren et al. | 73/517 B |
| 4,342,227 | 8/1982 | Petersen et al. | 73/517 R X |
| 4,483,194 | 11/1984 | Rudolf | 73/517 R |
| 4,553,436 | 11/1985 | Hansson | 73/517 R |

FOREIGN PATENT DOCUMENTS 2006439 10/1978 United Kingdom .

OTHER PUBLICATIONS

Roylance et al., 'A Batch-Fabricated Silicon Accelerometer', IEEE Transactions on Electron Devices, vol. ED-26, No. 12, Dec. 1979.
Jolly et al., 'Miniature Cantilever Beams Fabricated by Arisotropic Etching of Silicon', Dept. of Electrical Engineering, U. of California, Berkeley, Mar., 1980.

Primary Examiner—Stewart J. Levy
Assistant Examiner—Scott M. Oldham
Attorney, Agent, or Firm—Oblon, Fisher, Spivak, McClelland & Maier

[57] ABSTRACT

A directional accelerometer and a process for the microlithographic fabrication of such an accelerometer. The accelerometer includes a substrate having at least one recess to define at least one beam in the substrate. One of the ends of the beam is integrally formed with the remainder of the substrate. The beam, which is oriented in the first direction, is deformable into the recess in a second direction only, parallel to the substrate surface and perpendicular to the first direction. The second direction corresponds to the acceleration component to be measured. Electrical connections and contacts are formed in the substrate for the device measuring the deformations of the beam. These measurements make it possible to determine the acceleration components.

25 Claims, 5 Drawing Figures

DIRECTIONAL ACCELEROMETER AND ITS MICROLITHOGRAPHIC FABRICATION PROCESS

BACKGROUND OF THE INVENTION

The present invention relates to a directional accelerometer and its microlithographic fabrication process. As its name indicates, the directional accelerometer makes it possible to measure a single component of the acceleration of a moving body.

Generally, an accelerometer essentially comprises a moving mass m (pendulum) and means making it possible to measure the force $F = m\gamma$ due to the acceleration $\gamma$ of a moving body.

The presently commercially available accelerometers comprise detachable mechanical parts. The volume of such accelerometers is very large, in view of the large number of parts which form the same, as well as their complex manufacturing technology, particularly taking account of the problem of positioning the various elements constituting said accelerometers and the assembly thereof.

The use of techniques resulting from semiconductor technology is at present being developed with the aim of reducing the size of such accelerometers, together with their production costs, particularly by batch fabrication on the same flat substrate. Such an accelerometer fabrication procedure is described in an article by K. PETERSEN by Proceedings of the IEEE, Vol. 70, No. 5, May 1982.

In FIG. 1 is shown in longitudinal sectional form, the basic diagram of an accelerometer constructed in accordance with this novel procedure. The accelerometer comprises a substrate 2, made e.g. from silicon or glass, which has a recess 4. Onto the upper surface of the substrate is deposited, e.g. by vacuum deposition, a flexible thin layer 6 in the form of a beam and more particularly made from silica, doped silicon or metal, which overhangs the recess 4 formed in the substrate. This beam, which is able to deform or move in a direction perpendicular to the surface of the substrate represented by direction z, supports at its free end a seismic mass 8.

The measurement of the displacement of mass 8, which is proportional to the component of the acceleration in direction z which it is wished to measure, either takes place through the measurement of the variation of the capacitance of the capacitor defined by the thin layer 6 in the form of a beam and substrate 2, or with the aid of a piezoresistive element attached to said thin layer.

The above accelerometer in fact corresponds to what can best be done at present on a silicon plate, but suffers from a number of disadvantages. In particular, the flexible beam 6 can give rise to internal stresses leading to the bending of the beam, even when there is no acceleration. These stresses, which are very difficult to control, are particularly due to the accelerometer fabrication process. In addition, these stresses vary with the temperature.

Another disadvantage is caused by the stack of different materials, which have different expansion coefficients and which also lead to the formation of inadmissible stresses.

Moreover, as the mass 8 attached to the flexible beam 6 is off center with respect to the beam axis, this type of accelerometer is also sensitive to the component of the acceleration in a direction parallel to the surface of substrate 2, such as direction y. However, a good directional accelerometer must only be sensitive to a single component of the acceleration to be measured. This phenomenon is further aggravated when the beam 6 bends in the absence of acceleration, due to stresses within the actual beam.

Moreover, due to the lack of symmetry of the structure of the accelerometer, it is very difficult to perform a differential measurement of the displacement of mass 8. However, it is not possible to carry out a precise measurement of the position of the beam without such a procedure.

In order to obviate this lack of symmetry, it would be possible to join a second symmetrical substrate to the first with respect to the thin layer 6. Such a device is described in the article in IEEE Transactions on Electron Devices, Vol. ED-26, No. 12, December 1979, New York 45A, pp. 1911-1917 entitled "A batch fabrication silicon accelerometer" by L. N. ROYLANCE et al. In the case of said device, the problem of internal stresses occurs at the actual substrate, as a result of the sealing. In addition, this process is complicated and costly.

Another disadvantage of these accelerometers is their limited sensitivity. Thus, the dimensions of the thin layer 6 in the form of a beam are fixed, so that it is difficult to increase the seismic mass 8, the latter having at the most a thickness of a few microns.

A possible variant of the accelerometer shown in FIG. 1 consists of having two ends of a thin layer 6 fixed to the substrate, which makes it easier to fix the starting position of mass 8, even when there are stresses within the said layer. However, such an accelerometer has a much more rigid structure and consequently a reduced sensitivity.

SUMMARY OF THE INVENTION

The object of the present invention is to provide a directional accelerometer and its fabrication process, which are based on microelectronics technology, i.e. permitting a batch fabrication on the same substrate, whilst obviating the disadvantages referred to hereinbefore.

More specifically, the present invention relates to a directional accelerometer making it possible to measure one component of the acceleration of a moving body, wherein it comprises a substrate having at least one recess defining at least one beam in the substrate, whereof one of the ends is integral with the remainder of the substrate, said beam which is oriented in a first direction being able to deform in a single direction, called the second direction in the said recess and which is parallel to the surface of the substrate and perpendicular to the first direction, said second direction corresponding to the component of the acceleration to be measured, as well as contacts and electrical connections on the substrate used for connecting means for measuring deformations of the said beam, said measurements making it possible to determine the value of said component of the acceleration.

This accelerometer makes it possible to measure one component of the acceleration directed parallel to the surface of the substrate, whereas the prior art accelerometers made it possible to measure one component of the acceleration directed perpendicular to the surface of the substrate.

Moreover, due to the fact that the beam is directly machined into the substrate, the problems of multiple substrates or stacks of layers are eliminated, which makes it possible to considerably reduce the mechanical stresses of the accelerometer and provide an accelerometer having an excellent thermal stability.

According to a preferred embodiment of the accelerometer according to the invention, the means for measuring deformations of the substrate are realised in the substrate.

Varied acceleration measuring ranges can easily be obtained by acting on the dimensions and shape of the beam, or by possible additions of masses, whilst maintaining the symmetry of the accelerometer. Advantageously, the beam of the accelerometer according to the invention has a much larger thickness dimension than width dimension, which makes it possible to obtain a very directional accelerometer.

Moreover, according to a preferred embodiment of the accelerometer according to the invention, the free end of the beam is able to support a block formed in the substrate and able to move into the recess of the substrate, in said second direction, under the action of the component of the acceleration to be measured. This makes it possible to obviate the need for joining a seismic mass, particularly electrolytically, as was the case with the prior art accelerometers.

Obviously, the accelerometer substrate can be made from any random material and preference is given to the use of monocrystalline α quartz (the crystalline structure of quartz which occurs below 537° C.) or silicon for the same.

According to a preferred variant of the invention, the accelerometer comprises a spring, formed in the substrate, located in the extension of the block and connecting the latter to the remainder of the substrate in the first direction.

According to a preferred embodiment of the accelerometer according to the invention, the measuring means comprise at least one variable capacitance capacitor defined by a surface of the block and generally transverse to the second direction, a substrate surface facing said block surface, said surfaces being covered by a metal layer, and by the space located between said metallized surfaces.

Advantageously, these measuring means also comprise at least one constant capacitance capacitor defined by another recess formed in the substrate, having two facing surfaces, generally transverse with respect to the second direction and covered with a metal layer.

As a result of this constant capacitance capacitor, it is possible to perform a differential measurement of the deformations of the beam and/or the block, in this way leading to a precise measurement of the component of the acceleration to be measured, which was difficult with the prior art accelerometers.

The present invention also relates to a process for the production of microlithography of a directional accelerometer of the type defined hereinbefore, wherein it comprises the stages of forming a mask on the substrate making it possible to define the shape of the different elements of the accelerometer formed in the substrate, etching regions of the substrate which are free from the mask and forming contacts and electrical connections for the accelerometer and means for measuring deformations of the beam.

In this fabrication process, the stresses at the conductor-substrate interface act perpendicular to the substrate, i.e. perpendicular to the sensitive axis of the accelerometer and not along the same, as was the case in the prior art accelerometers. Thus, there is a total absence of twisting or deformation of the moving elements of the accelerometer when there is no acceleration, together with an excellent thermal stability of the accelerometer.

Advantageously, the substrate is etched by a dry etching process and particularly by reactive ionic etching, which can be advantageously used on any random type of material forming the accelerometer substrate. Moreover, this type of etching has the advantage of fixing the shape of the accelerometer elements formed in the substrate through the shape of the mask, whilst being independent of the crystal orientation of the substrate.

According to a variant of the process, it is also possible to use anisotropic chemical etching in the case where the substrate is monocrystalline (silicon, quartz). However, in this case, if straight sided beams are required, the crystal orientation of the substrate cannot be of a random nature.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
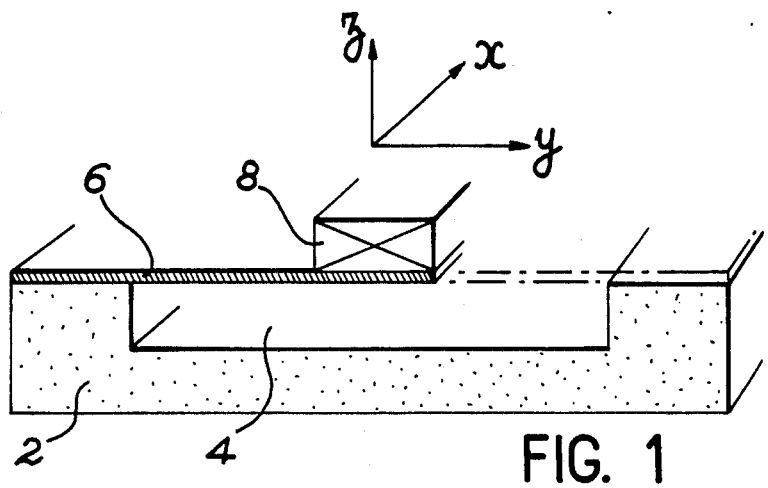
FIG. 1, already described, in longitudinal section the basic diagram of a prior art directional accelerometer.
Figure 2:
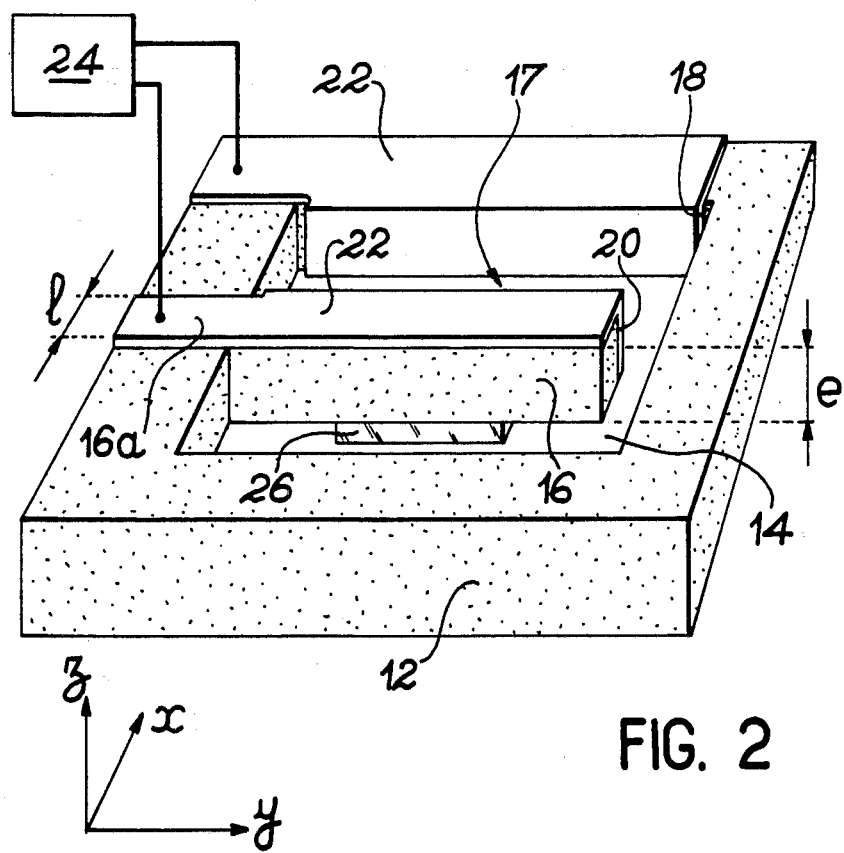
FIG. 2 a perspective view illustrating the principle of the accelerometer according to the invention.

FIG. 2 is a perspective view of the basic diagram of the accelerometer according to the invention, which comprises a substrate 12, which is preferably formed from an insulating material such as silicon, silica or monocrystalline α quartz, which has a recess 14 passing completely through the substrate. Within the substrate, recess 14 defines a flexible beam 16, whose ends 16a are integral with the remainder of the substrate. This beam 16, which is oriented in a direction y parallel to the upper surface of substrate 12, can deform in a direction x parallel to said substrate surface and perpendicular to direction y, direction x corresponding to the direction of the acceleration component to be measured. The measurement of the deformations of displacements of beam 16 in direction x makes it possible to determine the value of the acceleration component in said direction, said deformations being proportional to the value of said component.

Through machining the flexible beam 16 directly in substrate 12, it is possible to overcome problems caused by the use of multiple layers in the prior art accelerometers.

Advantageously, the means making it possible to measure the deformations of beam 16 when the latter is subject to an acceleration can be formed in substrate 12. These means can in particular be constituted by a variable capacitance capacitor 17, defined by recess 14 and for this purpose having two metallized lateral surfaces, e.g. 18 and 20, which face one another and which are oriented parallel to direction y. The deposition of conductive strips 22 on the upper surface of the substrate 12 makes it possible to connect the variable capacitance capacitor 17 to a conventional measuring system 24, which makes it possible to determine variations of the capacitance of said capacitor.

On the basis of these measurements, it is easy to determine the values of the component in acceleration direction x of a body, designated $\gamma_x$, with the aid of the formula $$\gamma_x = (K/m) \times (\epsilon_o S/C) \times (\Delta C/C),$$

in which $\epsilon_o$ is the dielectric permittivity of the vacuum, S the surface of the capacitor coatings, K the rigidity constant of the beam, m its mass, C the capacitance of the capacitor and $\Delta C$ the capacitance variation. The various connections and metallizations of the accelerometer can be realised in a double chrome and gold layer.

So as to obtain a very directional accelerometer i.e. only making it possible to measure the acceleration component of a body in direction x, beam 16 must have a much larger thickness dimension e than width dimension l, as shown in FIG. 2.

Taking account of the symmetry of the accelerometer and the thickness of beam 16, it is always possible to add one or more seismic masses such as 26 to the beam. The addition of one or more seismic masses 26 makes it possible to considerably increase the accelerometer sensitivity.

Figure 3:
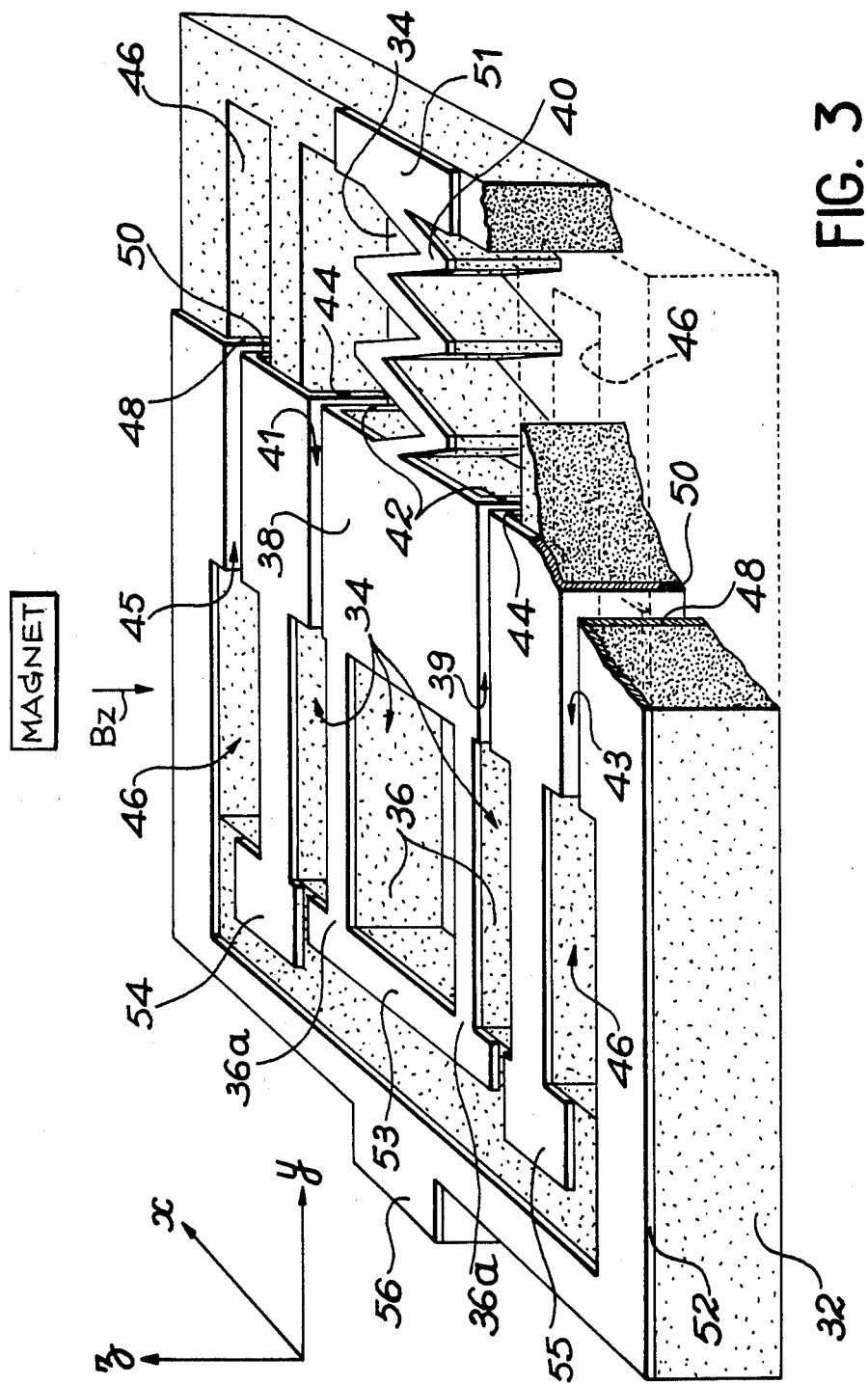
FIG. 3 a perspective view of a special embodiment of the accelerometer according to the invention, FIG. 3a showing its electrical equivalent.

FIG. 3 is a perspective view of a special embodiment of the accelerometer according to the invention. The accelerometer comprises a substrate 32, e.g. made from silicon or monocrystalline $\alpha$ quartz of section z (section along z axis), in which is formed a recess 34 passing entirely through the substrate and inter alia defining therein, two flexible beams 36, whereof one of the ends 36a is integral with the remainder of substrate 32. These beams 36, which are oriented in a direction y parallel to the upper surface of substrate 32, can move or rather deform in a direction x parallel to the surface of the substrate and perpendicular to said direction y. Direction x corresponds to the direction of the acceleration component to be measured.

These two beams 36, which have a much greater thickness than width, support at their free end a block 38, which is e.g. shaped like a rectangular parallelepiped, whose thickness is equal to that of the beams. This block 38, formed in substrate 32, can move or rather deform in recess 34 in the substrate in direction x. This accelerometer also comprises a spring 40, formed in the substrate and located in the extension of block 38 symmetrically with respect to beams 36, so that the latter can be joined to the remainder of substrate 32. This spring 40, which is oriented in direction y and has a thickness equal to that of beams 36 makes it possible to electrically connect the electrodes deposited on the moving parts (beams, blocks) of the accelerometer, without making the accelerometer structure rigid in such a way that its sensitivity would be reduced.

The means for measuring the deformations of block 38 in direction x are also formed in substrate 32. These means more particularly comprise two identical variable capacitance capacitors 39, 41, which are defined by the lateral faces 42 of block 38, i.e. the faces of the block oriented parallel to direction y by the surfaces 44 of recess 34 facing the said lateral faces 42 of the block, said surfaces 44 and 42 being covered by a metal layer, and by the space located between the metallized surfaces 42 and 44. The measurements of the variations of the capacitance of the thus defined capacitors make it possible to determine the deformations of block 38 in direction x, when the latter is subject to an acceleration in this direction.

In order to carry out a differential measurement of the deformations of block 38, the accelerometer according to the invention can be provided with one or more constant capacitance capacitors 43, 45. To this end, the accelerometer comprises recesses such as 46, formed in substrate 32 and located on either side of recess 34 in direction y. These recesses 38 have two facing surfaces respectively 48 and 50, oriented in direction y and covered with a metal layer. The metallized surfaces 48, 50 of recess 46, as well as the space between these two surfaces, define the constant capacitance capacitors 43, 45. This space has the same dimensions (thickness, width and length) as that between the metallized surfaces 42, 44.

The deposition of a metal layer 52 on the upper surface of substrate 32 makes it possible to produce the various contacts 53, 54, 55, 56 and electrical connections of the variable capacitance capacitors 39, 41 and constant capacitance capacitors 43, 45. This metal layer 52 must have an adequate shape to ensure that there are no short-circuits between the different capacitors.

Figure 3A:
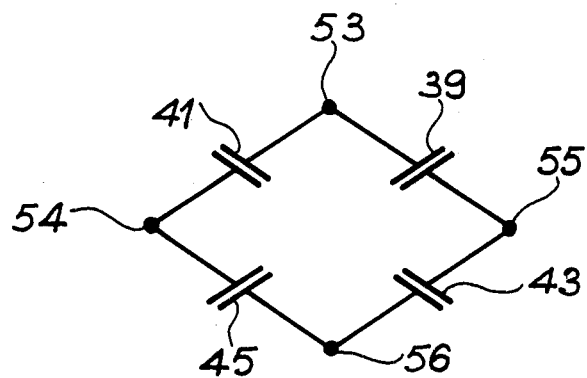

FIG. 3a shows an electrical diagram illustrating the capacitance bridge of the accelerometer of FIG. 3. Deformations of block 38 are detected by measuring the unbalance of the capacitance bridge, as shown in FIG. 3a.

It is advantageously possible to utilize the measurement of this unbalance for exerting an opposing force $F_x$ in direction x to force $F = m\gamma$ due to the acceleration $\gamma$, so as to make the unbalance of the bridge 0 (servo-system). One of the possible means for exerting the said force $F_x$ consists of applying a magnetic field $B_z$ perpendicular to the surface of the substrate and a current of intensity $I_y$ in direction y between points 53 and 51. The feedback force is then given by the equation $F_x = B_z \times I_y \times l$, l being the length of the current on which $B_z$ acts. In this case, the capacitive detection is used for zero detection (block at rest) and the electric current in the system formed by the beams, block and spring makes it possible to balance the acceleration effect to be measured at block 38, as a result of the action of magnetic field $B_z$. The determination of the acceleration then takes place by that of the current necessary for balancing the capacitance bridge (FIG. 3a), the intensity $I_y$ of said current being directly proportional to the acceleration value.

It should be noted that the detection means described hereinbefore can be used for measuring both accelerations and decelerations.

Moreover, the detection system described hereinbefore is only one possible embodiment of the measuring means. Other means, based on the use of piezoresistors deposited on the upper surface of the substrate or based on optical detection procedures can also be used.

In order to cover a varied acceleration range, it is possible to vary the dimensions of seismic mass 26 by merely changing the shape of the etching mask.

A description will now be given of the process for the fabrication of an accelerometer according to the invention, which uses microlithography.

The different elements of the accelerometer formed in the substrate, such as beams 16 or 36, block 38 and spring 40, as well as the measuring means can be formed by etching substrate 2 or 32 in which the said elements are produced. The said etching is e.g. a dry etching process, such as reactive ionic etching or anisotropic wet etching, can be carried out by using a mask, preferably formed from a conductive material such as a double layer of gold and chrome, which covers the upper surface of the substrate and makes it possible to define the exact shape of the different accelerometer elements.

In the case of dry etching, there is a limitation of an etching depth of a few dozen microns and the width of the beam must be a few microns, if a good directivity is to be obtained. In this case, an interesting substrate can be constituted by silica obtained by thermal growth on silicon. After the etching process has passed through the silica, it is possible to disengage the rear of the beam by chemically etching the silicon, which supports the silica. The advantage of this process it that it can be used on an integrated silicon circuit.

According to another variant, it is possible to only chemically etch the substrate, but in this case there is a dependence on the crystalline anisotropy of the substrate. By acting on said ansiotropy and that of the chemical etching product, it is possible to obtain the desired shape of the different elements forming the accelerometer. Good candidates for this method are α quartz of section z (axis z perpendicular to the plane of the substrate) and monocrystalline silicon for forming the substrate. In the case of quartz, use will e.g. be made of a mixture of HF and NH$_4$F as the etching product at 90° C.

The different contacts and electrical connections of the accelerometer formed on the substrate surfaces can be obtained either after eliminating the mask used for etching the substrate by appropriate metallization of the etched substrate surface, or by adequate metallization of the substrate before forming the etching mask on the then metallized substrate.

Another method for obtaining these contacts and connections consists of producing a conductive mask on the substrate, preferably in the form of a double layer of chrome and gold, which makes it possible to obtain both the shapes of the different accelerometer elements formed in the substrate and to produce said electrical connections and contacts.

Figure 4:
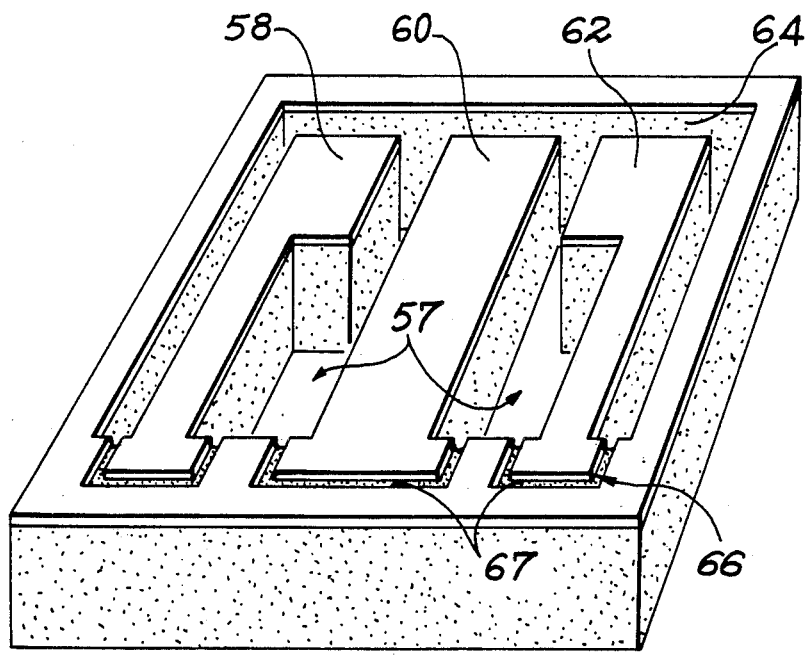
FIG. 4 a special embodiment of the fabrication process of the accelerometer according to the invention.

FIG. 4 shows the principle of the single mask making it possible to define both the shape of the substrate elements of the accelerometer and produce the electrical connections and contacts thereof. This mask is formed by a conductive layer covering the upper surface of the substrate and having conductive strips such as 58, 60, 62 with the shape of the different accelerometer elements, which are formed in the substrate and which are to be provided with the electrical connections and contacts, as well as an adequately shaped recess 64 revealing the regions of substrate 57 which are to be etched in order to free the different elements of the accelerometer. Moreover, in the substrate regions which are not to be etched, the mask has very fine grooves making it possible to electrically separate the different accelerometer connections.

The existence of these grooves which form a grid 66 makes it possible, during the etching of the substrate, to etch the same to a very limited depth at the grid, the etching operation coming up against crystal planes at a very low etching speed so that a good mechanical stability is maintained. This slight substrate etching is represented by notches such as 67. This substrate etching depth difference is dependent on the size of the mask patterns, as well as the crystalline anisotropy of the substrate. Thus, when the mask patterns are large (patterns 57), there is a depth etching, whereas when the patterns are small (grid 66), substrate etching is only superficial.

The final stage of the accelerometer fabrication process consists of producing vertical metallizations making it possible to define the constant capacitance of variable capacitance capacitors after mechanically masking the substrate. For this purpose, it is advantageously possible to use vacuum evaporation with an incidence angle of the evaporation medium on the substrate which differs from 90°.

The process according to the invention makes it possible to produce in batch form a plurality of directional accelerometers on the same substrate, which are able to measure varied acceleration or deceleration ranges.

What is claimed is:

1. A monodirectional accelerometer for measuring one component of an acceleration of a moving body, comprising:
    a substrate formed of a material and having at least one recess;
    at least one parallelepipedic beam placed in the recess and having a first end which is integral with said substrate, said beam being formed of said material, being oriented in a first direction, having a width in a second direction and being able to deform in the second direction in said recess and having a thickness higher than its width, said thickness being oriented in a third direction perpendicular to said first and second directions so that said beam is only deformable in said second direction, said second direction being parallel to the surface of said substrate and perpendicular to said first direction, said deformation in said second direction corresponding to said component of said acceleration to be measured;
    means for measuring deformations of said beam in said second direction to determine the value of said component of said acceleration; and
    electrical contacts formed on said substrate for connecting said means for measuring with said beam.

2. An accelerometer according to claim 1, wherein the measuring means are formed in the substrate.

3. An accelerometer according to claim 1, wherein the other end of the beam supports a block, which is formed in the substrate and is able to move in the substrate recess in the second direction under the action of said acceleration component.

4. An accelerometer according to claim 3, wherein it comprises a spring, formed in the substrate and arranged in the extension of the block, connecting the latter to the substrate in the first direction.

5. An accelerometer according to claim 3, wherein the measuring means comprise at least one variable capacitance capacitor defined by a surface of the block and which is generally directed transversely to the second direction, a surface of the substrate facing said surface of the block, said surfaces being covered with a metal layer, and by the space located between said metallized surfaces.

6. An accelerometer according to claim 5, wherein the measuring means comprise at least one constant capacitance capacitor defined by another recess formed in the substrate, which has two facing surfaces, which are generally directed transversely to the second direction and which are covered by a metal layer.

7. An accelerometer according to claim 1, wherein the substrate is formed from silica deposited on silicon.

8. An accelerometer according to claim 1, wherein the substrate is made from monocrystalline α quartz or silicon.

9. An accelerometer according to claim 5, wherein the measuring means comprise means making it possible to produce a magnetic field perpendicular to the surface of the substrate.

10. A process for the fabrication of a monodirectional accelerometer used for measuring one component of an acceleration of a moving body, said component being parallel to a first direction, said accelerometer comprising a substrate having at least one recess, at least one parallelepipedic beam placed in the recess and having a first end which is integral with said substrate, said beam oriented to a second direction parallel to a surface of said substrate and perpendicular to said first direction being able to deform only in said first direction and having a thickness higher than its width, said thickness being oriented to a third direction perpendicular to said first and second directions and said width being oriented to said first direction, measuring means for measuring deformations of said beam in said first direction and electrical contacts formed on said substrate for connecting said measuring means with said beam, said process comprising the following stages:
   forming on said substrate a mask which defines the shape of said recess, said beam and in particular the width of said beam,
   etching mask-free substrate regions in said third direction in order to form said recess and beam, the thickness of said beam being defined by said etching,
   forming said measuring means,
   eliminating said mask and
   metallizing the etched substrate in order to produce said electrical connections and contacts.

11. A process according to claim 10, wherein the substrate is etched by a dry etching process.

12. A process according to claim 10, wherein the substrate is etched by means of a chemical etching process.

13. A process according to claim 10, wherein the mask is formed from a conductive material.

14. A process according to claim 13, wherein the mask is made from a double layer of chrome and gold.

15. A process according to claim 10, wherein the measuring means comprise capacitors and metallization takes place by vacuum deposition on the substrate surfaces which are used for defining said capacitors, following the mechanical masking of the substrate.

16. A process for the fabrication of a monodirectional accelerometer used for measuring one component of an acceleration of a moving body, said component being parallel to a first direction, said accelerometer comprising a substrate having at least one recess, at least one parallelepipedic beam placed in the recess and having a first end which is integral with said substrate, said beam oriented to a second direction parallel to a surface of said substrate and perpendicular to said first direction being able to deform only in said first direction and having a thickness higher than its width, said thickness being oriented to a third direction perpendicular to said first and second directions and said width being oriented to said first direction, measuring means for measuring deformations of said beam in said first direction and electrical contacts formed on said substrate for connecting said measuring means with said beam, said process comprising the following stages:
   metallizing the substrate surface in order to produce said electrical connections and contacts,
   forming on said metallized substrate a mask which defines the shape of said recess, said beam and in particular the width of said beam,
   etching mask-free substrate regions in said third direction in order to form said recess and beam, the thickness of said beam being defined by said etching,
   forming said measuring means and
   eliminating said mask.

17. A process according to claim 16, wherein the substrate is etched by a dry etching process.

18. A process according to claim 16, wherein the substrate is etched by means of a chemical etching process.

19. A process for the fabrication of a monodirectional accelerometer used for measuring one component of an acceleration of a moving body, said component being parallel to a first direction, said accelerometer comprising a substrate having at least one recess, at least one parallelepipedic beam placed in the recess and having a first end which is integral with said substrate, said beam oriented to a second direction parallel to a surface of said substrate and perpendicular to said first direction being able to deform only in said first direction and having a thickness higher than its width, said thickness being oriented to a third direction perpendicular to said first and second directions and said width being oriented to said first direction, measuring means for measuring deformations of said beam in said first direction and electrical contacts formed on said substrate for connecting said measuring means with said beam, said process comprising the following stages:
   forming on said substrate a conductive mask which defines the shape of said recess, said beam and in particular the width of said beam and which produces said electrical connections and contacts, said mask being shaped like a grid, of which bars have a limited spacing in the substrate regions which are to be free from said electrical connections,
   etching mask-free substrate regions in said third direction in order to form said recess and beam, the thickness of said beam being defined by said etching, and
   forming said measuring means.

20. A process according to claim 19, wherein the substrate is etched by a dry etching process.

21. A process according to claim 19, wherein the mask is formed from a conductive material.

22. A process according to claim 21, wherein the mask is made from a double layer of chrome and gold.

23. A process according to claim 19, wherein the substrate is etched by a dry etching process.

24. A process according to claim 19, wherein the substrate is etched by means of a chemical etching process.

25. A monodirectional accelerometer for measuring component of an acceleration of a moving body, comprising:
   a substrate formed of a material and having at least one recess;

at least one parallelepipedic beam placed in the recess and having a first end which is integral with said substrate, said beam being formed of said material, being oriented in a first direction and being able to deform in a second direction in said recess and having a thickness higher than its width so that said beam is only deformable in said second direction, said second direction being parallel to the surface of said substrate and perpendicular to said first direction, said deformation in said second direction corresponding to said component of said acceleration to be measured;

said beam having a second end which supports a block, said block being formed in said substrate and being able to move in said recess in the second direction, said block being connected to the substrate in the first direction with a spring which is formed in the substrate;

means for measuring deformations of said beam in said second direction to determine the value of said component of said acceleration; and electrical contacts formed on said substrate for connecting said means for measuring with said beam.

* * * * *